United States Patent [19]

Kray

[11] 4,273,270
[45] Jun. 16, 1981

[54] TRIGGER ACTUATED AIR PRESSURE DISPENSING GUN

[76] Inventor: George C. Kray, 137 Plitt Ave., Farmingdale, N.Y. 11735

[21] Appl. No.: 68,380

[22] Filed: Aug. 21, 1979

[51] Int. Cl.³ ............................................. G01F 11/00
[52] U.S. Cl. .................................... 222/327; 222/389; 222/396
[58] Field of Search ............... 222/323, 324, 325, 326, 222/327, 389, 394, 396; 239/373; 128/203.13, 207.25

[56] References Cited

U.S. PATENT DOCUMENTS

| | | | |
|---|---|---|---|
| 1,520,998 | 12/1924 | Beach | 222/396 |
| 2,185,067 | 12/1939 | Sholes | 128/203.13 |
| 3,439,839 | 4/1969 | Schumann et al. | 222/389 X |
| 3,813,012 | 5/1974 | Laird | 222/326 |

Primary Examiner—Robert J. Spar
Assistant Examiner—Fred A. Silverberg

[57] ABSTRACT

An air powered dispenser connectable to a source of supply of pressurized air through a pressure reducing valve and a three-way valve. The air under pressure is supplied through a flexible air tube to a disposable syringe mounted on an adjustable guide fixed on a handle of a hand-held gun unit, in which is slidably mounted a trigger connected by a flexible tension cable unit to an actuator of the three-way valve. The hand-held gun unit is connected by the flexible tension cable unit and by the flexible air tube to the valves which may be located in a housing at a remote distance from the gun unit so as to eliminate the weight of the valves from the hand-held gun unit, while still providing finger control by the user of dispensing action.

7 Claims, 6 Drawing Figures

TRIGGER ACTUATED AIR PRESSURE DISPENSING GUN

FIELD OF THE INVENTION

This invention relates generally to an air powered gun dispenser for flowable materials.

STATEMENT OF PRIOR ART

The prior art, as exemplified by U.S. Pat. Nos. 2,175,522; and 3,985,268 is generally illustrative of various devices of this type. While such devices are generally acceptable for their intended purpose, they have not proven to be entirely satisfactory in that they are either complex and expensive to manufacture, or bulky and inconvenient to use, or require unusual skill and/or dexterity to operate. As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

The principal objects of this invention is to provide a device or article of this character which combines simplicity, strength and durability in a high degree, together with inexpensiveness of construction.

Other objects of this invention will in part be obvious and in part hereinafter pointed out.

SUMMARY OF THE INVENTION

This invention resides in an air powered dispenser connectable to a source of supply of pressurized air through a pressure reducing valve and a three-way valve. The air under pressure is supplied through a flexible air tube to a disposable syringe mounted on an adjustable guide fixed on a handle of a hand-held gun unit, in which is slidably mounted a trigger connected by a flexible tension cable unit to an actuator of the three-way valve. The hand-held gun unit is connected by the flexible tension cable unit and by the flexible air tube to the valves which may be located in a housing at a remote distance from the gun unit so as to eliminate the weight of the valves from the hand-held gun unit, while still providing finger control by the user of dispensing action.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENT

Figure 1:
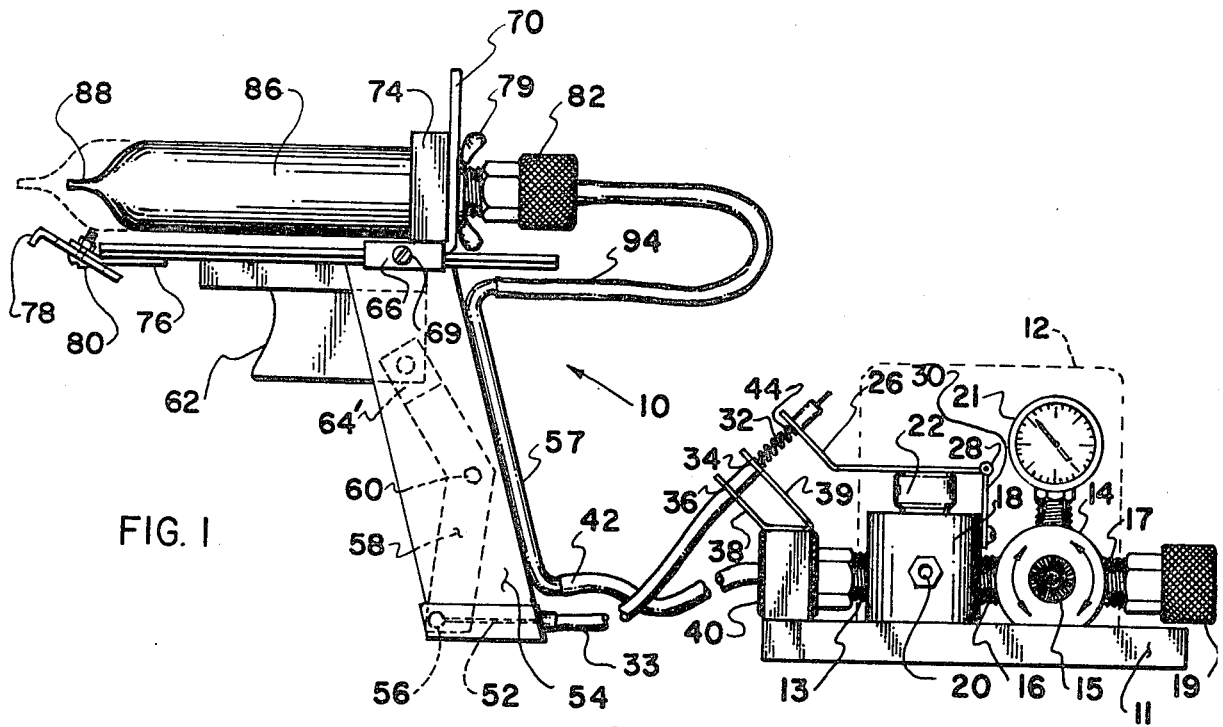
FIG. 1 is a diagrammatic view of the dispenser and of its valve assembly.

With reference to the drawing, there is shown and illustrated a gun dispenser for plastic or the like constructed in accordance with the principles of the invention as described herein.

Referring to the right-hand side of FIG. 1, there is shown a valve assembly forming part of the present invention and including a base 11 on which is fixed a housing 12 in which is mounted a pressure reducing valve 14 for reducing the pressure of air supplied thereto by line 17 joined to valve 14. Connected to reducing valve 14 is gauge 21. Line 17 may be joined by a disconnect fitting 19 to a source of air pressure with knob 15 employed for regulating the pressure of air issuing from valve 14, that is fed by hose 16 to three-way valve 18. Valve 18 has an exhaust vent outlet 20 thereon and actuator 22 and valve 18 is connected to air outlet tube 13. Vertical movement of actuator 22 is controlled by bent lever 26 which has one end pivoted on pivot 28 on vertical support 30 fixed externally on valve 18 and whose other end holds the end of cable 32 of a bicycle-brake type flexible tension control cable unit. Housing 33 of the cable unit passes through lower opening 36 but not upper opening 34 in the legs of fork support 38 fixed on the top of quick disconnect coupler 40. Coupler 40 connects outlet tube 13 to flexible air hose 42 which supplies air to the hand-held gun unit 10. An expansion spring 44 urges rod 26 away from fork 38 to lift rod 26 and actuator 22 to the normal (closed) position of valve 18.

Figure 2:
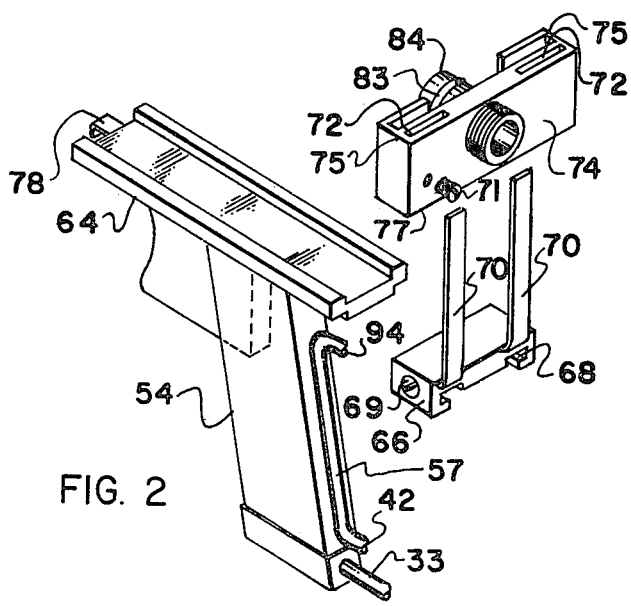
FIG. 2 is a perspective partly exploded view showing details of the handle and adjustable syringe support.
Figure 3:
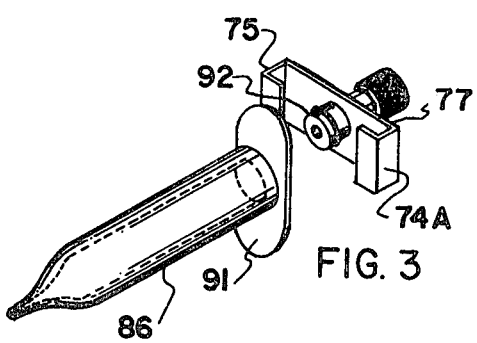
FIG. 3 is an exploded perspective view of the syringe and syringe adapter.

The front end of cable 32 extends to opening 52 in the bottom of hollow handle 54, with cable 32 secured through opening 52, and through opening 56 in bent trigger lever 58 to trigger lever 58, which is pivoted by pin 60 to the inside surface of handle 54. Trigger 62 (FIG. 2) has a slot in the back thereof in which is fitted by a rivet, the flat lug 64' that is fixed to the upper end of lever 58. It is seen that pushing backwards against the front end of trigger 62 has the effect of pulling on flexible cable 32 so as to move actuator 22 downwards to open valve 18. Cable housing 33 is of a semi-flexible nature and extends between handle 54 and opening 34 in upper fork leg 39.

Fixed to the upper end of handle 54 is a horizontal carriage support 64 on which is slidaby mounted metal support 66. Support 66 has a pair of spaced upright arms 70 that fit into vertically extending bores 72 of a disconnect adapter assembly 74. Arms 70 are fixed to adapter 74 by screw 71.

A securing screw 69 is threaded in a side of slide 66 for engaging the side of support 64 to fix the assembly at a desired location thereon. The opposite or front end of suppport 64 has a lever 76 welded to the underside thereof to which is slidably secured, by fastener pin 80, a bent adjustable guide 78 projecting beyond support 64. The end of air hose 42 is connected by bent tube 57 on handle 54 via flexible tube 94 to quick disconnect coupler 82 whose outlet end 84 detachably fits into the open rear end of disposable syringe 86 which contains, for example, liquid cement, and whose front end has a discharge nozzle 88.

Figure 6:
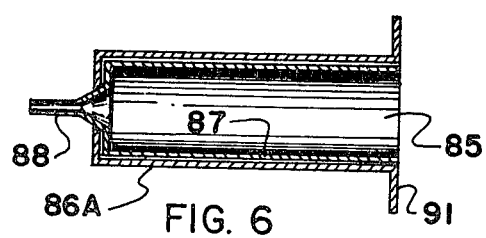
FIG. 6 is a sectional view of an alternative form of syringe and container.

The gun of the invention can use also a profiled cartridge instead of syringe 86 by replacing same with a cylinder provided with a head for holding the cartridge, as shown in FIG. 6.

It is possible to use syringes which range in length from 2½ cc to 30 cc in capacity.

Figure 4:
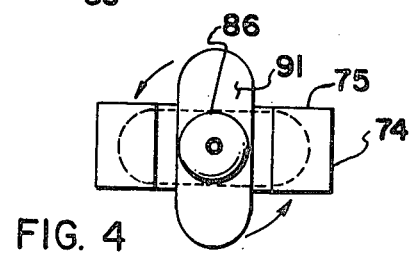
FIG. 4 is an end view taken along lines 5—5 of FIG. 3.

As shown in FIG. 4, syringe 86 is formed at its rear end with a pair of radial projecting ear sections 91 and a concentric circular opening of a size to snugly fit over cylindrical tubular plug section 92. An O-ring 83 is mounted in an external groove on plug section 92 of outlet end 84 to seal the syringe interior to the interior of plug section 92 which interior communicates with the interior of attached flexible air line 94 joined to disconnect fitting 82.

FIG. 4 illustrates an alternative embodiment 74A of the adapter assembly. Both adapter assemblies 74 and 74A are formed with a pair of radial projecting U-section shaped jaws 75 of a size and location to each firmly grip about an ear section 91 of a syringe 86 in the assembled mode of syringe to adapter. Rotation of the syringe about its longitudinal axis, by ninety degrees, releases the syringe ears from engagement with the adapter flanges as shown in FIG. 4, enabling a syringe to be removed from or replaced on an adapter.

Figure 5:
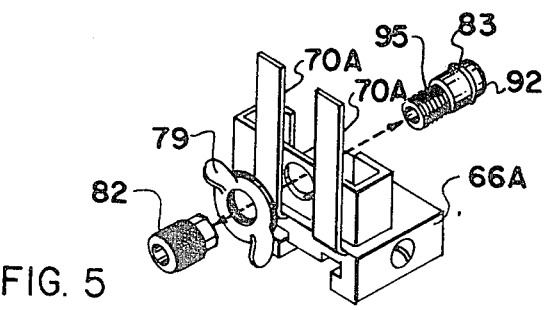
FIG. 5 is a perspective view of the adapter and support unit.

Adapter assembly 74A differs from assembly 74 as shown in FIG. 5, in that plug 92 of assembly 74A is joined externally to disconnect fitting 82 by a threaded tube 95 fixed through wall 77 of adapter 74A, with disconnect fitting 82 mounted a spaced distance on tube 95 from the wall 77 of adapter 75A. A wing nut 79 is freely threaded on tube 95, between wall 77 and disconnect fitting 82.

Adapter 74A detachably fits on alternative embodiment support 66A which differs from support 66 in that vertical upright arms 70A are spaced apart to fit externally about tube 95 and of a size to be gripped between the external face of wall 77 and tightened wing nut 79 in the installed position of adapter 75A to support 66A, as shown in FIG. 5.

Alternatively, an external container 86A formed with external ear sections 91 may serve as a permanent detachable housing for enclosure of a disposable container 87 fitted with a nozzle 88 as shown in FIG. 6, with rear opening 85 of container 87 of a size to fit snugly about plug 92 when installed.

Three-way valve 18 in the normal closed position blocks the flow of air from inlet tube 16 and also vents outlet tube 13 to the atmosphere through exhaust vent outlet 20, so that in the normal position shown in FIG. 1, there will be no air pressure upon the contents of syringe 86 aside from atmospheric pressure, and hence, there will be no flow of the contents out of the syringe nozzle. Upon actuation of valve 18 by depression of actuator 22, caused by manual pressure against trigger 62, valve 18 blocks exhaust vent outlet 20 and connects inlet tube 16 to outlet tube 13 for flow of pressurized supply air into syringe 86.

Since air supply tube 42 and cable housing 33 and enclosed cable 32 are of flexible nature, the relatively heavy air valve 18, gauge 21, and pressure reducing valve 14 may be mounted at a distance from the relatively light hand-held dispenser unit.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. The useful features of the invention are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. Air compression means to apply air under pressure from a source thereof to a container of flowable material which container has a nozzle through which said material may be discharged, comprising a valve assembly with an inlet port connectable to an air source, said valve assembly incorporating a three-way valve, an actuator extending from said three-way valve for controlling the flow of air passing therethrough; a spring-biased pivoted lever for biasing said actuator to a normal position;

a gun unit including a handle, trigger means including a trigger arm pivoted in said handle; a flexible tension control cable connecting said trigger arm and said pivoted lever for activating said actuator away from the normal position and into the actuated position when tension is applied to the said control cable; a holder fixed to the upper part of said handle; holding means for a said container adjustably and slidably mounted on said holder; a coupler on said holding means communicating with said container in the installed position of the container; a flexible air line connecting said three-way valve to said coupler; such that the gun unit may be held in a hand of the user and controlled by pressure of a finger of said hand against said trigger means and with the valve assembly mounted at a remote location from the gun, in which said three-way valve in the normal biased condition blocks the inlet port and connects the flexible air line to an exhaust outlet of the valve that leads to ambient air outside the valve under atmospheric pressure, and in which said three-way valve in the actuated condition blocks the said exhaust outlet and connects the inlet port to the flexible air line.

2. The invention as recited in claim 1, wherein said container is a disposable syringe.

3. The invention as recited in claim 1, further including in the valve assembly a pressure reducing valve and a pressure gauge connected to said pressure reducing valve with means for regulating pressure of air passing through said valve, with said valve joined between the inlet port and the three-way valve.

4. The invention as recited in claim 1, further including a base on which the valve assembly is mounted, with a coupler mounted on said base, a hose connecting the three-way valve to said base coupler; a forked member fixed on said base coupler in spaced relation to the pivoted lever; the control cable passing through said forked member and having an end secured to said pivoted lever, and an expansion spring surrounds said cable between said leg of said forked member and said pivoted lever, said base coupler fitted with means to detachably connect to the flexible air line joined to the coupler of the gun unit.

5. The invention as recited in claim 1, in which the container is formed with a pair of radial projecting members extending from the rear end of the container, and an adapter unit is mounted on the holder; said adapter unit fitted with a pair of U-shaped jaws that extend from opposed sides of the adapter unit of a size and shape to each grip one of the radial projecting members of the container in the installed position of the container to the adpater, said flanges shaped such that substantial rotation of the container, relative to the adapter about the longitudinal axis of the container serves to completely disengage said projections from said flanges to permit the container to be moved away from the adapter along said longitudinal axis.

6. The combination as recited in claim 5, in which the adapter is fitted with a cylindrical-hollow plug mounted concentrically between said flanges, said plug of a size to snugly fit into the bore of an opening in the rear of the container, which opening communicates with the interior of the container, said plug joined to the coupler of the holding means, which coupler is so fixed to the adapter.

7. The combination as recited in claim 5, in which the adapter is detachably mounted to the holder.

* * * * *